US010759311B2

(12) United States Patent
Petit et al.

(10) Patent No.: US 10,759,311 B2
(45) Date of Patent: Sep. 1, 2020

(54) RAIL FOR VEHICLE SEAT AND VEHICLE SEAT COMPRISING SUCH A RAIL

(71) Applicant: Faurecia Sièges d'Automobile, Nanterre (FR)

(72) Inventors: Fabrice Petit, Saint Georges des Groseillers (FR); Vincent Nardin, Flers (FR); Ludovic Ferre, Flers (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 47 days.

(21) Appl. No.: 16/131,938

(22) Filed: Sep. 14, 2018

(65) Prior Publication Data

US 2019/0084453 A1 Mar. 21, 2019

(30) Foreign Application Priority Data

Sep. 15, 2017 (FR) ...................... 17 58571

(51) Int. Cl.
*B60N 2/42* (2006.01)
*B60N 2/06* (2006.01)
*B60N 2/07* (2006.01)
*B60N 2/08* (2006.01)
*B60N 2/02* (2006.01)
*B60N 2/22* (2006.01)

(52) U.S. Cl.
CPC ............. *B60N 2/43* (2013.01); *B60N 2/0232* (2013.01); *B60N 2/067* (2013.01); *B60N 2/0715* (2013.01); *B60N 2/0806* (2013.01); *B60N 2/0818* (2013.01); *B60N 2/0875* (2013.01); *B60N 2/0881* (2013.01); *B60N 2/0825* (2013.01); *B60N 2/0843* (2013.01); *B60N 2/2213* (2013.01)

(58) Field of Classification Search
CPC ...... B60N 2/43; B60N 2/0881; B60N 2/0875; B60N 2/0806; B60N 2/0232; B60N 2/0818; B60N 2/067; B60N 2/0715; B60N 2/0825; B60N 2/0843; B60N 2/2213
USPC .......... 248/424, 429, 430; 297/344.1, 344.17
See application file for complete search history.

(56) References Cited

U.S. PATENT DOCUMENTS

| | | | | |
|---|---|---|---|---|
| 5,348,373 A | * | 9/1994 | Stiennon | B60N 2/0228 248/424 |
| 6,902,235 B2 | * | 6/2005 | Rohee | B60N 2/08 248/424 |
| 7,150,441 B2 | * | 12/2006 | Leguede | B60N 2/08 248/423 |
| 7,669,825 B2 | * | 3/2010 | Sung | B60N 2/0825 248/424 |
| 9,045,061 B2 | * | 6/2015 | Kostin | B60N 2/1615 |

(Continued)

FOREIGN PATENT DOCUMENTS

| | | |
|---|---|---|
| DE | 10046204 A1 | 6/2002 |
| EP | 2716492 A1 | 4/2014 |

(Continued)

OTHER PUBLICATIONS

French Search Report corresponding to French application No. FR 1758571, dated May 16, 2018, 2 pages.

*Primary Examiner* — Tan Le
(74) *Attorney, Agent, or Firm* — Reising Ethington P.C.

(57) ABSTRACT

A rail for vehicle seat that has first and second sliding rail members driven by a motorized drive mechanism. The rail further includes a mechanical latch actuated when crash conditions are detected.

10 Claims, 11 Drawing Sheets

(56) References Cited

U.S. PATENT DOCUMENTS 9,321,376 B2     4/2016   Hozumi et al.
9,827,879 B2 *  11/2017   Fujita .................. B60N 2/0232

FOREIGN PATENT DOCUMENTS

| EP | 3012146 A1 | 4/2016 |
|----|------------|--------|
| JP | 2010076553 A | 4/2010 |
| JP | 2016215931 A | 12/2016 |

\* cited by examiner

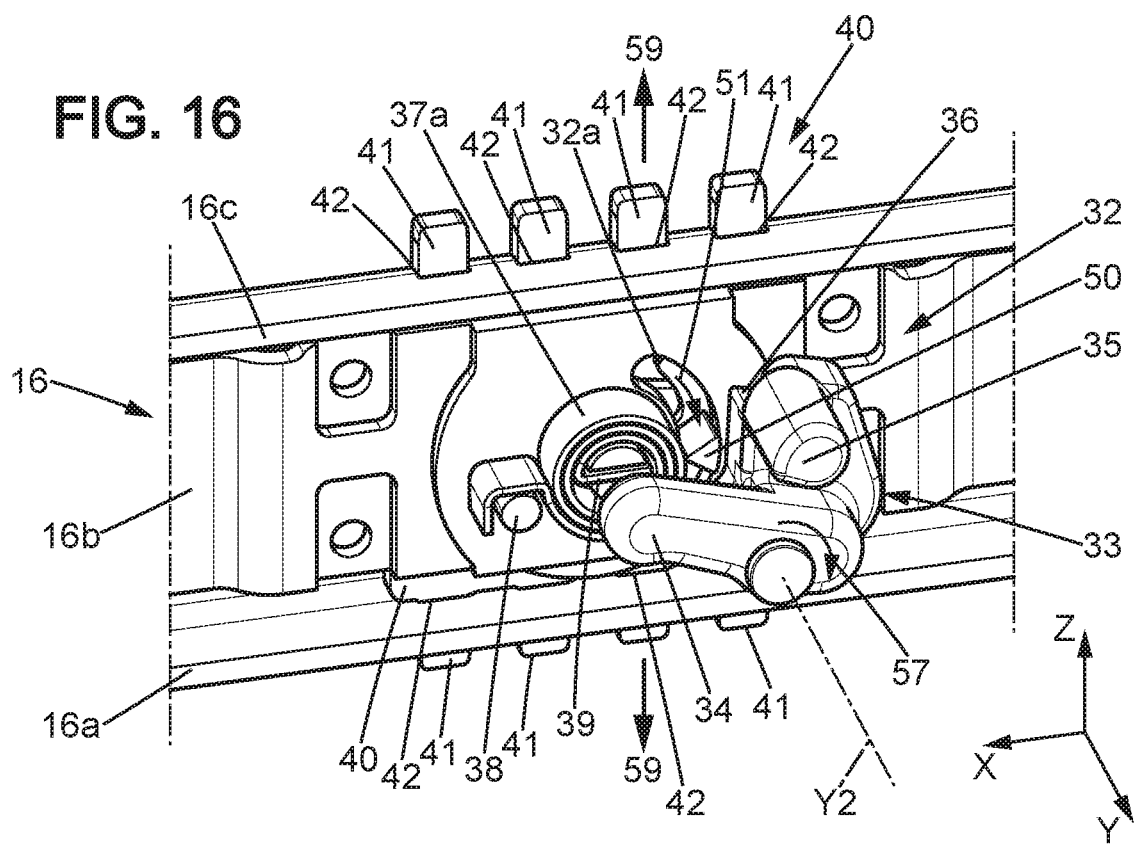
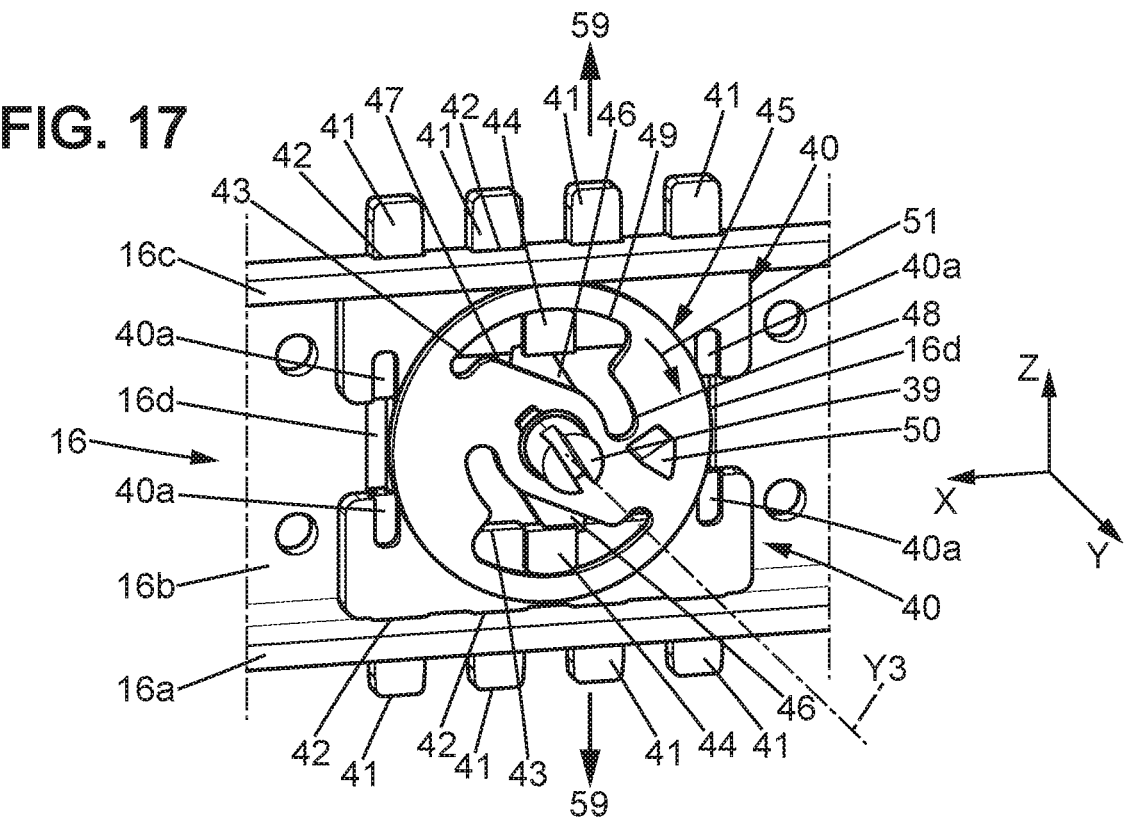

RAIL FOR VEHICLE SEAT AND VEHICLE SEAT COMPRISING SUCH A RAIL

TECHNICAL FIELD

The present invention relates to rails for vehicle seats and to vehicle seats comprising such rails.

More particularly, the invention relates to a rail for a vehicle seat, comprising first and second rail members mounted so as to slide in relation to one another along a longitudinal direction, said rail having a motorized drive mechanism able to cause relative movement between the first and second rail members along the longitudinal direction.

BACKGROUND

Document JP2016215931A discloses an example of a rail of this type. A disadvantage of such motorized rails is that the mechanical strength of the rail in the event of a vehicle crash is determined by the strength of the motorized drive mechanism. These considerations may require the use of a drive mechanism that is substantially of metal, and is therefore heavy, expensive, and possibly noisy when subjected to the vibrations from operation of the vehicle.

Document JP2010076553A discloses a rail for a vehicle seat comprising movement prevention means actuated during rapid braking or when the seat is sliding.

SUMMARY

The present invention is intended to provide a motorized rail for a vehicle seat which has a high mechanical strength in case of a crash with the vehicle, without being particularly heavy, complex, or expensive.

For this purpose, according to one aspect, the invention proposes a rail for a vehicle seat, comprising first and second rail members mounted so as to slide in relation to one another along a longitudinal direction, said rail comprising a motorized drive mechanism able to cause relative movement between the first and second rail members along the longitudinal direction, said rail further comprising:
  at least one mechanical latch that is movable between an unlocked position where said latch allows the first and second rail members to move freely in relation to one another along the longitudinal direction, and a locked position where said latch immobilizes the first and second rail members in relation to one another, said latch normally being held in the unlocked position,
  and a latch control device able to detect crash conditions and, if crash conditions are detected, to control the latch so as to move it to the locked position,
  wherein the motorized drive mechanism comprises a rack integral with the first rail member and a motor device mounted on the second rail member and comprising a pinion engaged with the rack, at least the pinion being mounted so as to be movable in relation to the rack between an engagement position where said pinion is engaged with the rack and a disengagement position where said pinion is at least partially disengaged from the rack, the pinion being resiliently biased towards the engagement position and able to move from the engagement position to the disengagement position when one of the first and second rail members is subjected to a force greater than a predetermined threshold along the longitudinal direction,
  wherein the latch is movably mounted on the second rail member, and
  wherein the latch control device is mounted on the second rail member and can be actuated by movement of the pinion into the disengagement position.

With these arrangements, the rail is securely locked by the latch when crash conditions are detected, and this occurs regardless of the sizing and/or the material of the motorized drive mechanism (which can thus be primarily of plastic) and of the rack, without the rail being particularly heavy, complex, or expensive.

In preferred embodiments of the rail according to the invention, one or more of the following arrangements may also be used:
  the latch control device comprises a trigger movably mounted on the second rail member, the latch being resiliently biased towards the locked position and normally held in the unlocked position by the trigger, said trigger being actuated by movement of the pinion to the disengagement position so as to release the latch;
  the latch control device comprises a control member movably mounted on the second rail member and movable with the pinion between the engagement position and the disengagement position, the trigger being movable on the second rail member between a rest position where said trigger prevents the latch from moving to the locked position, and a release position where said trigger allows the latch to move to the locked position, said trigger being resiliently biased towards the rest position and comprising a cam able to act on the control member so as to maintain the pinion in the engagement position as long as one among the first and second rail members is not subjected to a force exceeding said predetermined threshold along the longitudinal direction, the control member being able to act on the cam of the trigger to move the trigger to the release position when one among the first and second rail members is subjected to a force greater than said predetermined threshold along the longitudinal direction;
  the trigger and the control member are pivotally mounted on the second rail member;
  the control member is integral with the motor device;
  the trigger is able to keep the pinion resiliently applied against the rack when said trigger is in the rest position (it is thus possible to close the gap between the pinion and the rack);
  the latch control device comprises a latch control cam which is movable between an unlocking position where the latch control cam allows the latch to be in the unlocked position and a locking position where said latch control cam pushes the latch back to the locked position, the latch control cam being resiliently biased towards the locking position and being integral with a pin which, in the rest position of the trigger, abuts against a stop edge of the trigger so as to hold the latch control cam in the unlocking position, the pin no longer interfering with said stop edge when the trigger is in the release position;
  the latch control cam is integral with a latch control mask which comprises at least one retaining edge engaging with a relief of the latch to hold the latch in the unlocked position when the latch control cam is in the unlocking position;
  the latch is movable perpendicularly to the longitudinal direction and comprises teeth which traverse guide holes formed in the second rail member, said teeth being able to penetrate corresponding holes in the first rail member.

The invention also relates to a vehicle seat comprising two rails as defined above and a seating portion carried by said rails. Each rail may comprise its own motorized drive mechanism, which avoids cluttering the space under the seat with a motor and mechanical transmission means.

BRIEF DESCRIPTION OF DRAWINGS

Other features and advantages of the invention will be apparent from the following description of one of its embodiments, given as a non-limiting example, with reference to the accompanying drawings.

In the drawings:

FIG. 16 is a detail view similar to FIG. 15, without the control member and the trigger spring, and FIG. 17 is a detail view similar to FIG. 16, without the cover plate which normally covers the latches.

In the various figures, the same references designate identical or similar elements.

DETAILED DESCRIPTION

Figure 1:
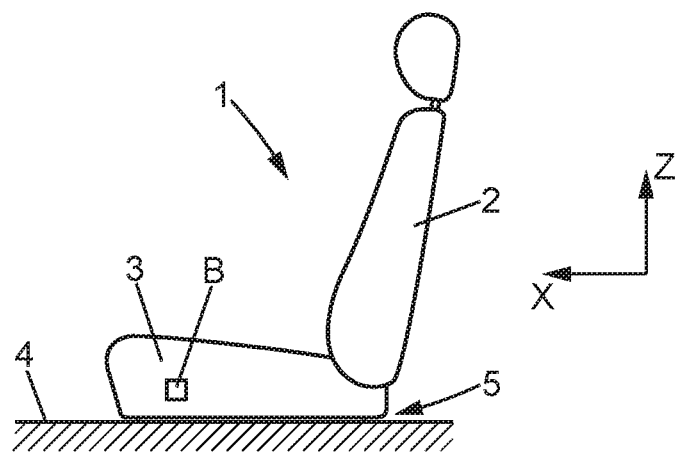
FIGS. 1 and 2 are schematic views, respectively from the side and front, of a seat that can include rails according to an embodiment of the invention.
Figure 2:
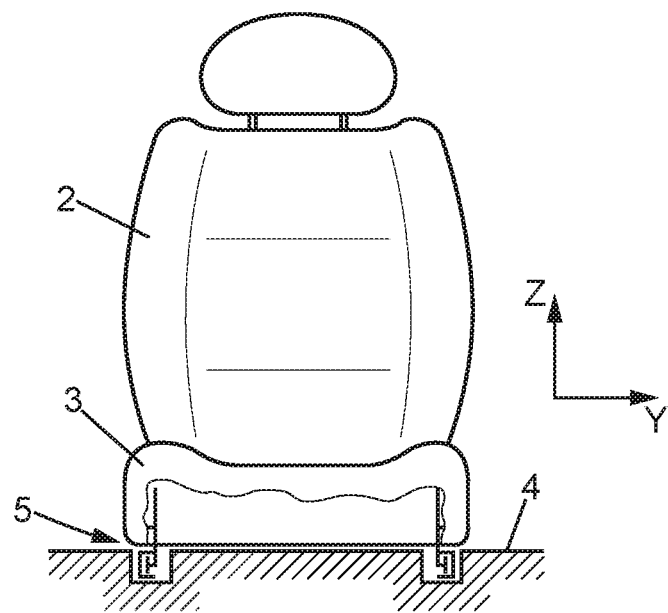
Figure 3:
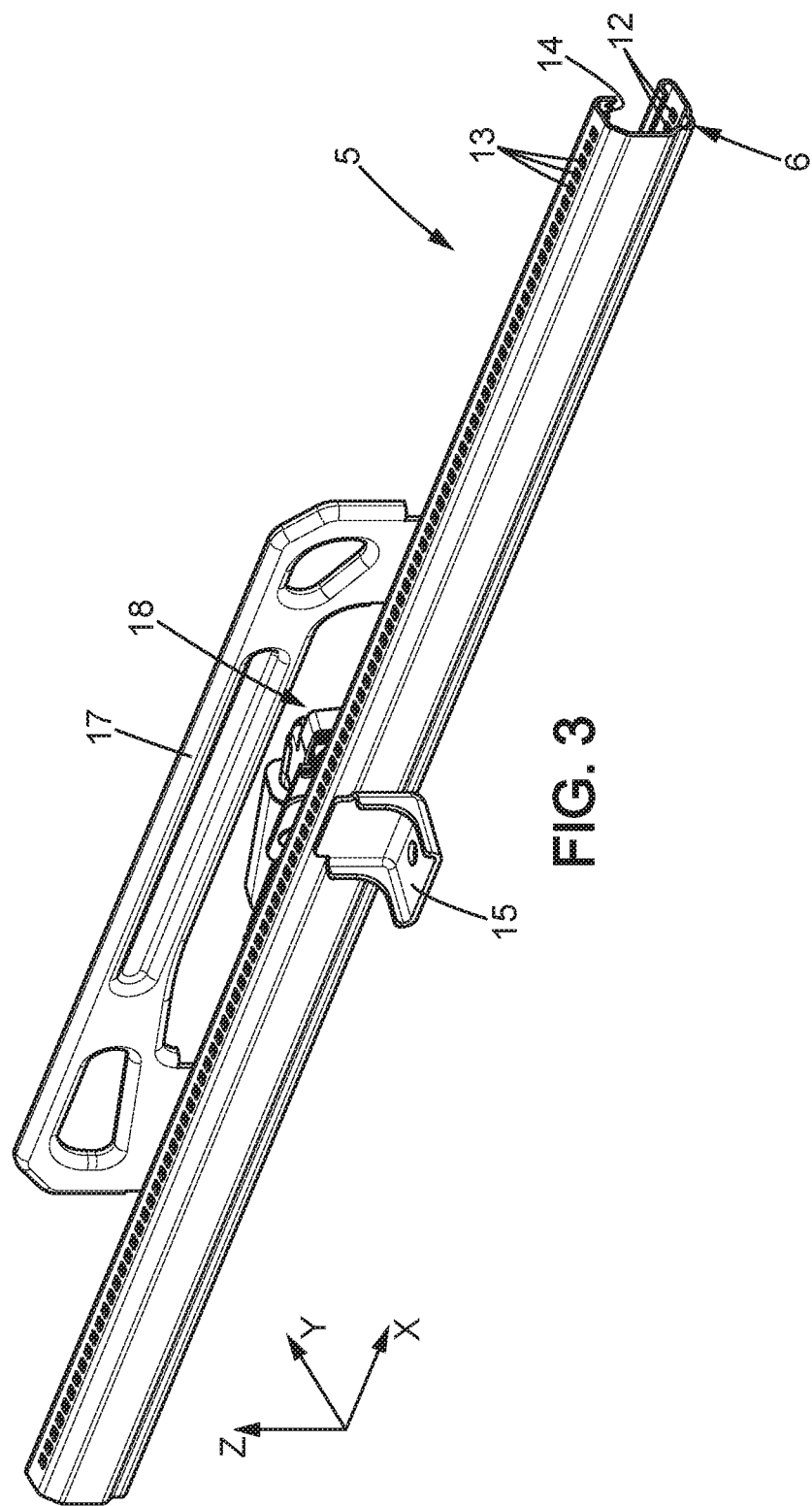
FIGS. 3 and 4 are perspective views of one of the rails of the seat of FIGS. 1 and 2, viewed from two directions.
Figure 4:
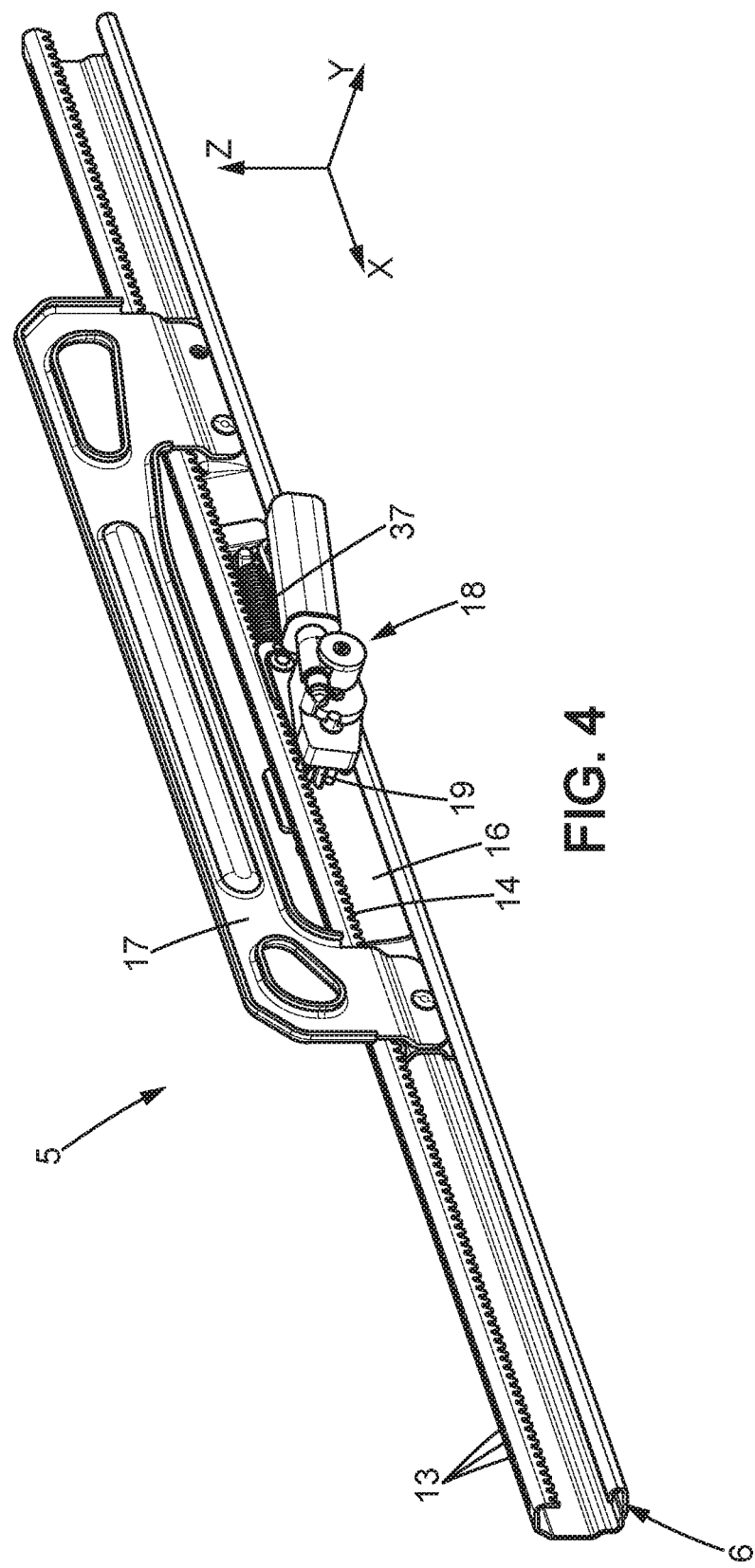

FIGS. 1 and 2 show a motor vehicle seat 1 which comprises a backrest 2 carried by a seating portion 3, the latter being mounted on the floor 4 of the vehicle so as to slide along a substantially horizontal longitudinal direction X.

The seating portion 3 is connected to the floor 4 by two parallel rails 5 extending along the longitudinal direction X.

Each of the rails 5 comprises an electrically motorized drive mechanism which will be described below, control of the mechanisms of the two rails 5 being synchronized by a central electronic control unit (for example, a microcontroller or similar) on the basis of the commands received, particularly from a two-way control button B or similar that can be actuated by a user.

As shown in FIGS. 3 to 6, each rail 5 comprises first and second rail members 6, 16 mounted so as to slide in relation to one another along the longitudinal direction X. One of these first and second rail members is connected to the floor 4 of the vehicle, the other to the seating portion 3. In the example shown, the first rail member 6 is integral with the floor 4 and the second rail member 16 is integral with the seating portion, but the reverse would be possible.

The first rail member 6 may be generally be a section, for example of metal. The second rail member 16 may also be a section, particularly of metal.

For simplicity, the first and second rail members 6, 16 will respectively be called the fixed section 6 and movable section 16 in the following description, without these names being limiting of the invention.

The motorized drive mechanism may comprise, for example, a rack 14 integral to the fixed section 6 and a motor device 18 mounted on the movable section 16. The motor device 18 may be for example a gear motor or the like, comprising a pinion 19 engaged with the rack 14.

Figure 5:
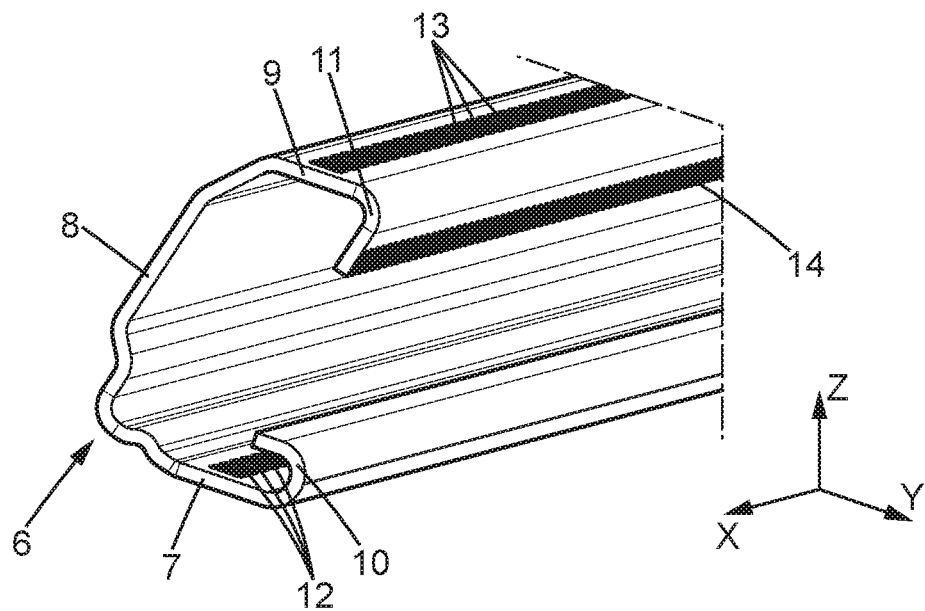
FIG. 5 is a partial enlarged view of the fixed section of the rail.
Figure 6:
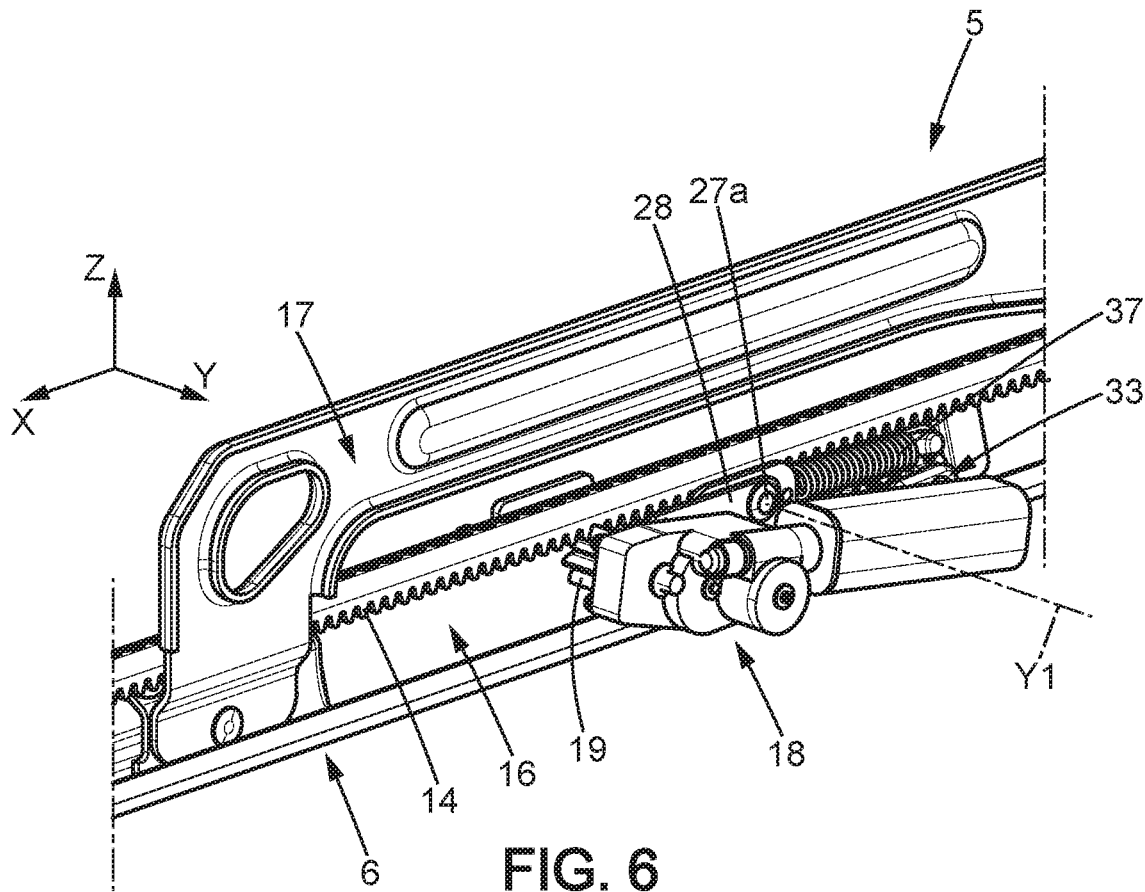
FIG. 6 is a detail view of FIG. 4, in the normal position of use.

As shown in more detail in FIG. 5, the fixed section 6 of each rail 5 may for example have a C shape which is open horizontally towards the other rail 5 of the seat.

The fixed section 6 may comprise for example:
  a lower flange 7 extending substantially horizontally and parallel to the longitudinal direction X and to a transverse horizontal direction Y perpendicular to the longitudinal direction X,
  a web 8 extending upwards (parallel to the longitudinal direction X and substantially along a vertical direction Z) from the outer edge of the lower flange,
  and an upper flange 9 extending substantially horizontally to the lower flange 7 from the upper edge of the web 8.

The free edge of the lower flange 7 may comprise a return 10 which folds back for example by substantially 180 degrees to form an inner groove.

The free edge of the upper flange 9 may comprise a return 11 extending downwards.

The lower flange 7 may comprise indentations, for example holes 12, aligned along the longitudinal direction X at regular intervals.

The upper flange 8 may comprise indentations, for example holes 13, aligned along the longitudinal direction X at regular intervals.

The return 11 of the upper flange may have a lower free edge which is cut out to form the rack 14.

Figure 7:
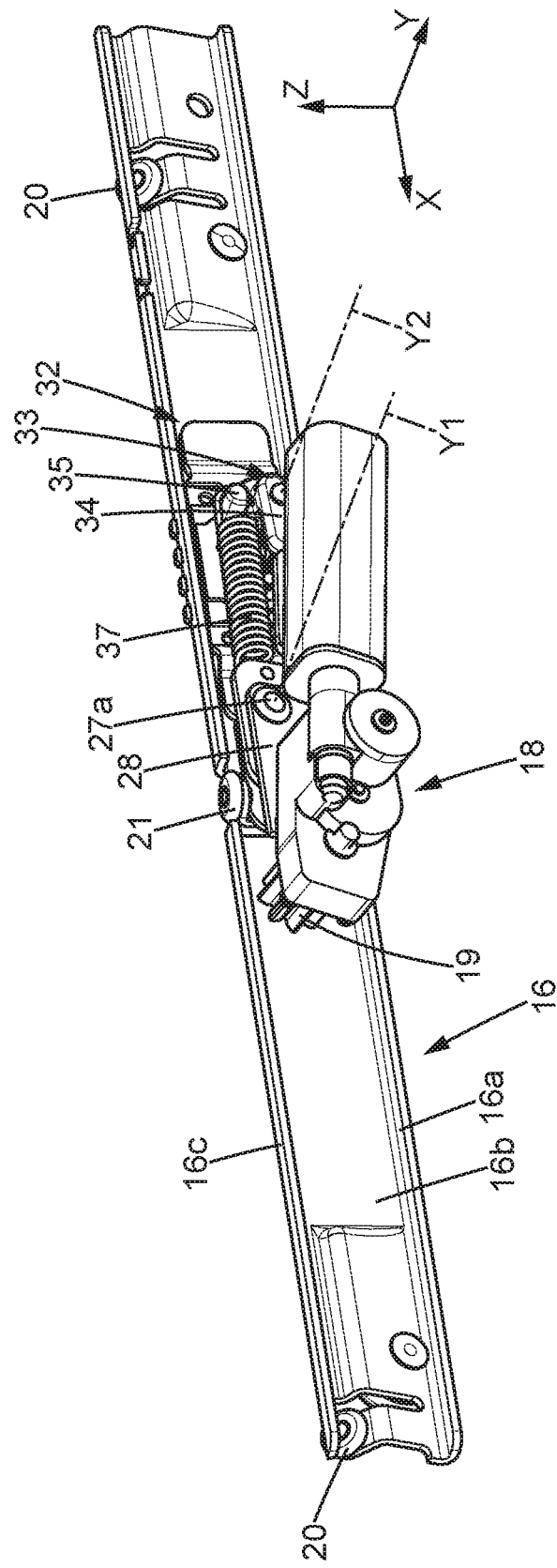
FIGS. 7 and 8 are perspective views of the movable section of the rail in the normal position of use, viewed from two directions.
Figure 8:
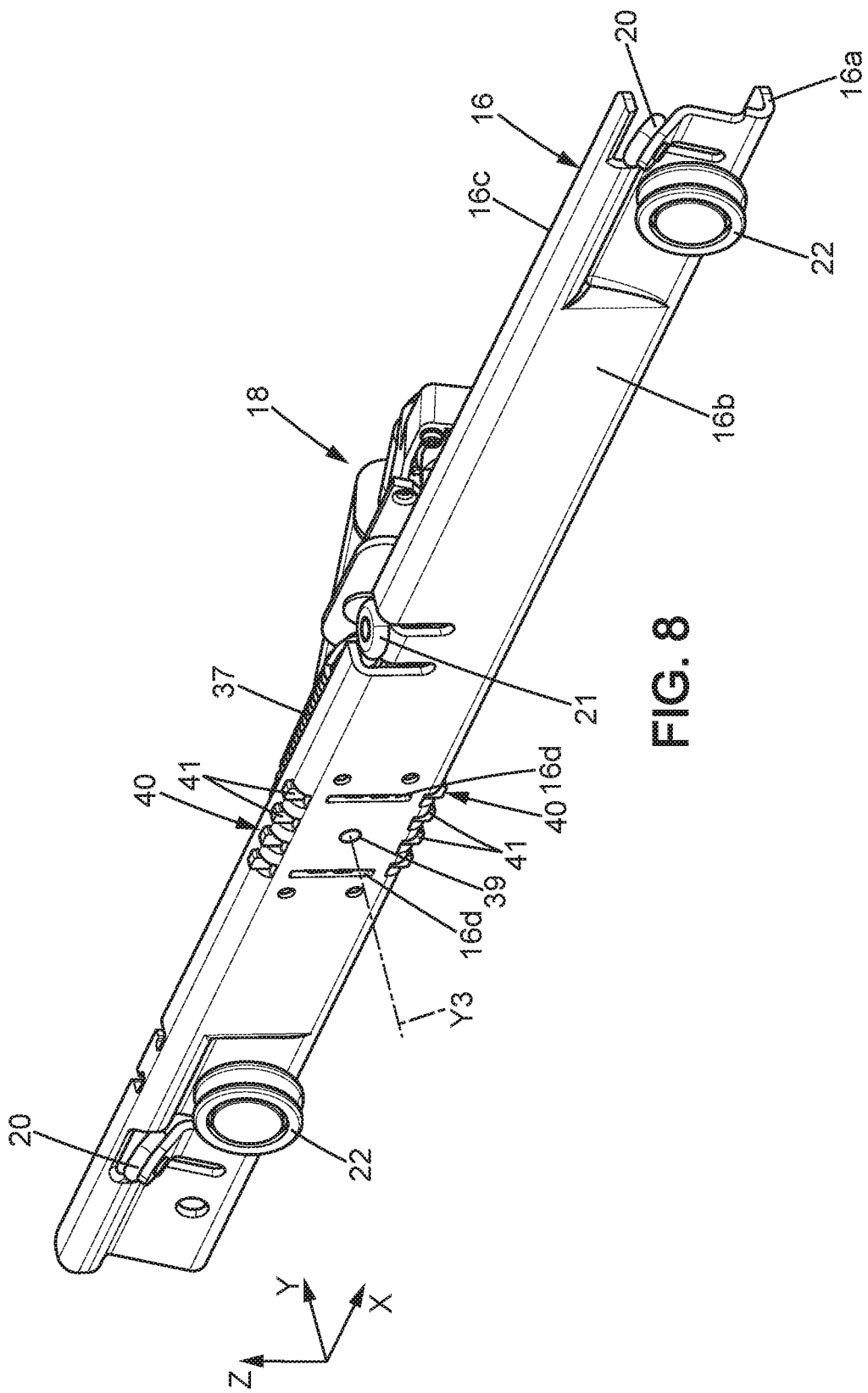

As shown in FIGS. 7 and 8, the movable section 16 may comprise a vertical web 16b adjacent to the web 8 of the fixed section, a lower flange 16a arranged above the lower flange 7 of the fixed section, and an upper flange 16c arranged below the upper flange 9 of the fixed section.

The movable section 16 may comprise rollers 20, 21, 22 rolling on the inner surface of the fixed section 6, enabling the movable section 16 to slide longitudinally.

The rail 5 further comprises:
  at least one mechanical latch 40 that is movable between an unlocked position where said latch 40 allows the movable section to slide freely along the longitudinal direction X, and a locked position where said latch 40 immobilizes the first and second rail members in relation to one another, said latch 40 normally being held in the unlocked position,
  and a latch control device able to detect crash conditions and, when crash conditions are detected, controls the latch to move it to the locked position.

The latch 40 may be mounted on the movable section 16 so as to move perpendicularly to the longitudinal direction X, for example along the vertical direction Z.

It is possible that the movable section 16 comprises two latches 40 respectively arranged towards the upper 16c and lower 16a flanges of the movable section.

As shown in FIGS. 7, 8, 11-13, each latch 40 may comprise teeth 41 traversing guide holes 42 respectively formed in the upper 16c and lower 16a flanges of the movable section. The teeth 41 of the latches are aligned along the longitudinal direction X and have the same pitch as the holes 12, 13 of the flanges 7, 9 of the fixed section 6, so that these teeth 41 are able to penetrate the corresponding holes 12, 13 in the locked position of each latch 40.

The latch control device can be adapted to detect crash conditions by any known means, either by electronic means (accelerometer, on-board cameras monitoring the vehicle environment, or other means) or by mechanical means. In the example shown, the means for detecting crash conditions are purely mechanical: the pinion 19 is mounted so as to be movable relative to the rack 14 between an engagement position where said pinion 19 is engaged with the rack 14 and a disengagement position where said pinion 19 is at least partially disengaged from the rack 14, the pinion 19 being resiliently biased towards the engagement position. The pinion 19 is adapted to move from the engagement position to the disengagement position when the movable section 16 undergoes a force greater than a predetermined threshold along the longitudinal direction X. For example, the threshold in question may be between 0.7 kN and 5 kN. The tendency towards at least partial disengagement of the pinion 19 conventionally occurs, due to the fact that the tangent common to a tooth of the pinion 19 and to the tooth of the rack 14 with which it is in contact is not perpendicular to the longitudinal direction.

Figure 9:
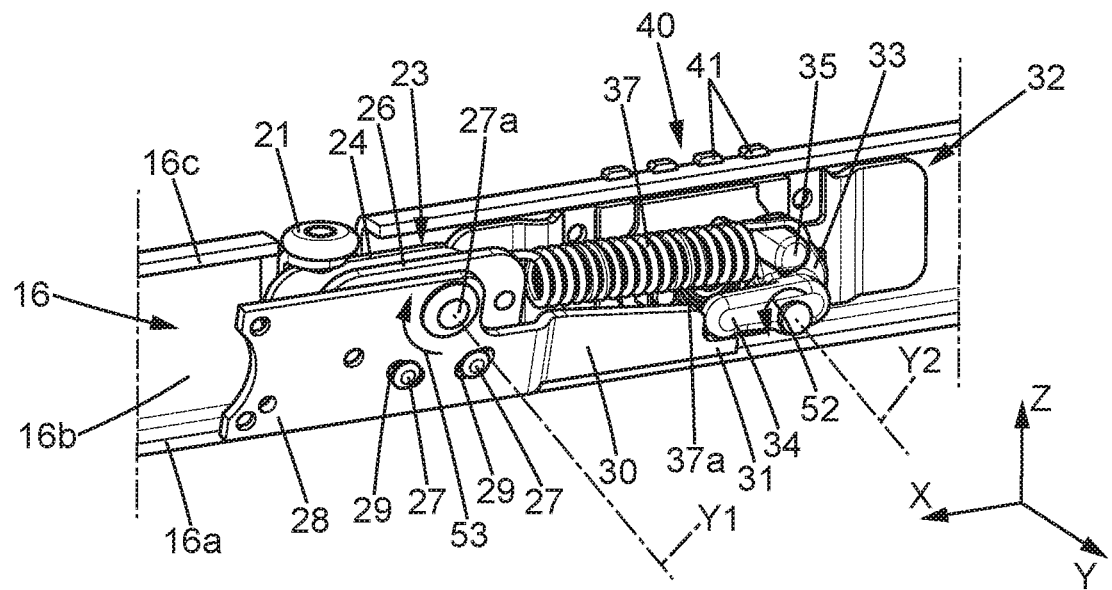
FIG. 9 is a detail view of FIG. 7, without the motor device.

In the particular example shown in the drawings, the pinion 19 is movable with the entire motor device 18 in relation to the rack 14. For example, as shown in FIGS. 7 and 9, the motor device 18 may be mounted on a control member 28 which is mounted so as to pivot relative to the movable section 16 about a pivot axis Y1 substantially parallel to the transverse direction Y. More specifically, the control member 28 may be in the form of a metal plate extending substantially in the X,Z plane and mounted so as to pivot on a support 23 integral to the movable section 16. The support 23 may possibly comprise sheet metal folded into a substantially U-shape which opens upwards, with a flange 24 fixed to the web 16b of the movable section, a bottom 25, and a flange 26 carrying the control member 28. The control member 28 may be mounted on the flange 26 by a pivot 27a. The control member 28 may, where appropriate, be further guided for example by pins 27 integral with the flange 26 and sliding in oblong holes 29 of the control member, the oblong holes 29 being formed as arcs of circles centered on the pivot axis Y1.

The control member 28 may comprise an arm 30 extending towards the latch(es) 40, terminated by an actuating finger 31 which controls a trigger 33 controlling the latch(es) 40.

The trigger 33 is movably mounted on the second rail member 16, and may be a metal part that is molded, sintered, cold-formed, or other. In particular, the trigger 33 may be mounted so as to pivot about a pivot axis Y2 substantially perpendicular to the web 16b of the movable section. In particular, the trigger may be mounted so as to pivot on a cover plate 32, for example a piece of sheet metal, which keeps the latch or latches 40 parallel to the web 16b of the movable section and which is fixed to said movable section.

The trigger 33 may comprise a finger-shaped cam 34 oriented towards the control member 28 and in contact with an upper edge of the actuating finger 31 of the control member. The cam 34 is held resiliently against the actuating finger 31 by at least one spring 37 which urges the trigger 33 in the angular direction 52 (FIG. 9). The spring 37 may for example be a coil spring hooked on said support 23 and on a finger 35 of the trigger. Due to the resilient biasing of the spring 37, the cam of the trigger exerts on the control member 28 a force that tends to rotate the control member in the angular direction 53 (FIG. 9) and to hold the pinion 19 elastically against the rack, with an elastic force which may be for example between 100 and 500 N.

In this manner, not only is the function of the latch or latches 40 ensured as will be explained below, but the gap between the pinion 19 and the rack 14 is closed.

As shown in more detail in FIGS. 10 to 13, the latch(es) 40 are resiliently biased towards the locked position and are normally held in the unlocked position by the trigger 33.

More particularly, the latch or latches 40 may be resiliently biased towards the locked position by a latch control cam 46, for example consisting of a cut piece of sheet metal, which can be mounted so as to pivot relative to the movable section 16 about a pivot axis Y3 parallel to axis Y2. The cam 46 may for example be integral with a shaft 39 turning on the web 16b of the movable section and on the cover plate 32. The latch control cam 46 is normally held by the trigger 33 in the locking position visible in FIGS. 10 and 12, where the latch control cam 46 allows the latch or latches 40 to be in the unlocked position.

The latch control cam 46 is resiliently biased in the angular direction 51 (FIGS. 12-13) towards a locking position where said latch control cam 46 pushes the latch or latches to the locked position. The latch control cam 46 bears resiliently against an inner edge 43 of the latch or of each latch 40, opposite from the teeth 41. The latch or latches 40 may possibly comprise pins 40a, for example formed by half-shearing, which slide in vertical slots 16d of the web 16b of the movable section, to improve the guiding of the latch or latches between their unlocked position and their unlocked position.

The resilient bias applied to the latch control cam 46 may be provided for example by a spiral spring of which one end is hooked for example on a pin 38 integral with the cover plate 32 and the other end is integral with the shaft 39 mentioned above.

Figure 10:
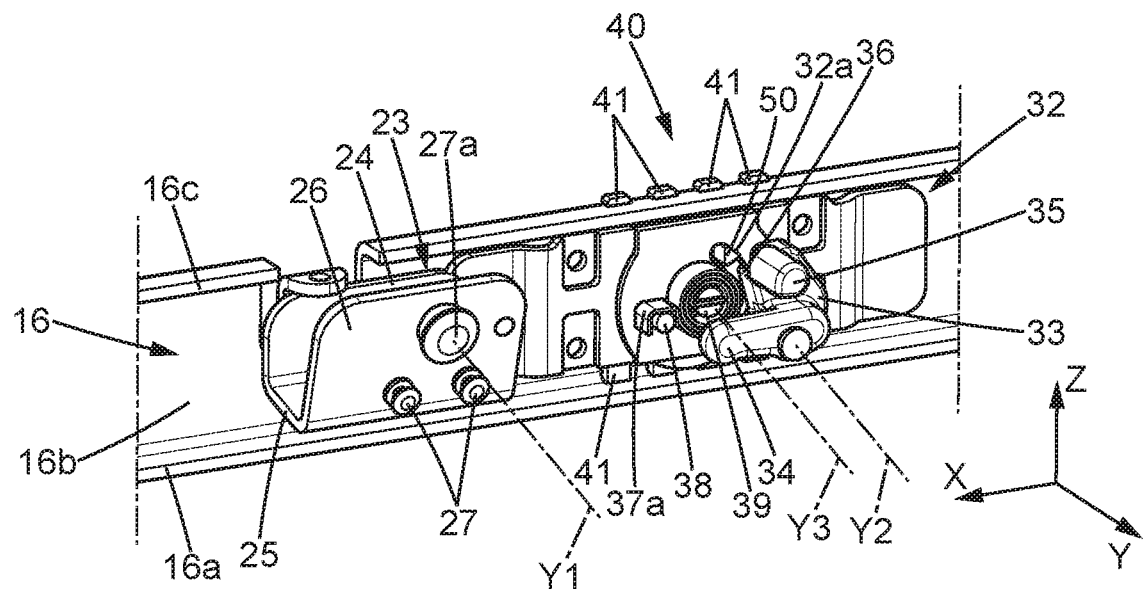
FIG. 10 is a view similar to FIG. 9, without the control member.
Figure 11:
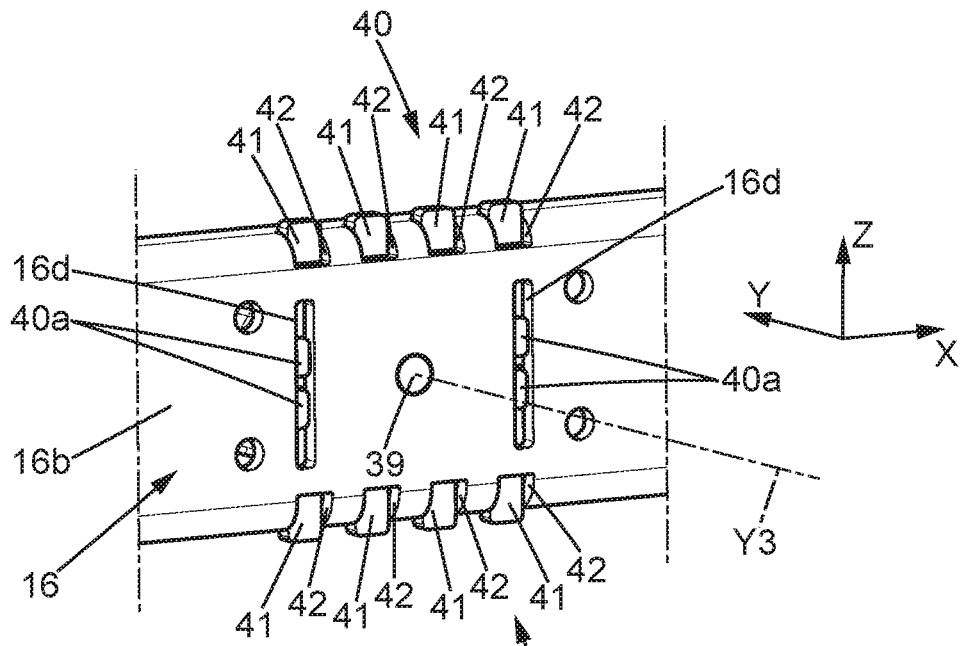
FIG. 11 is a detail view showing the movable section on the side opposite to the control member.
Figure 12:
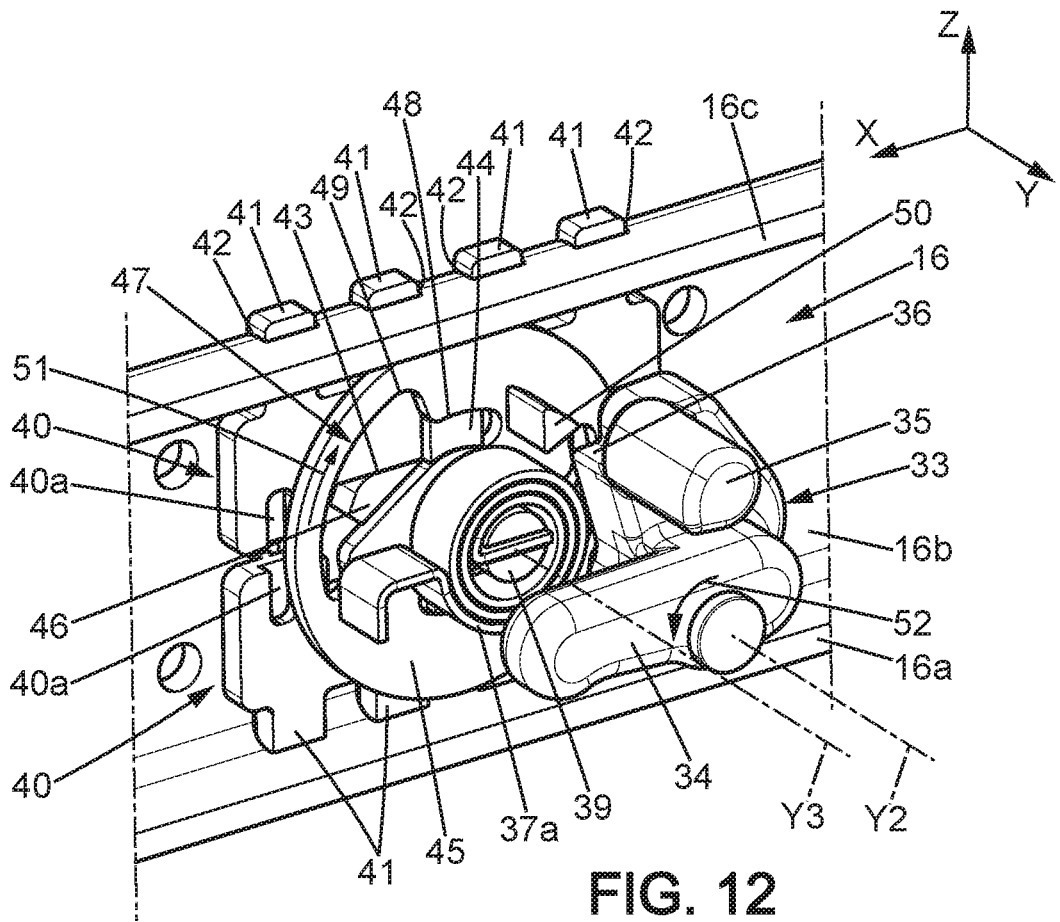
FIG. 12 is a detail view of FIG. 10, without the cover plate which normally covers the latches.
Figure 13:
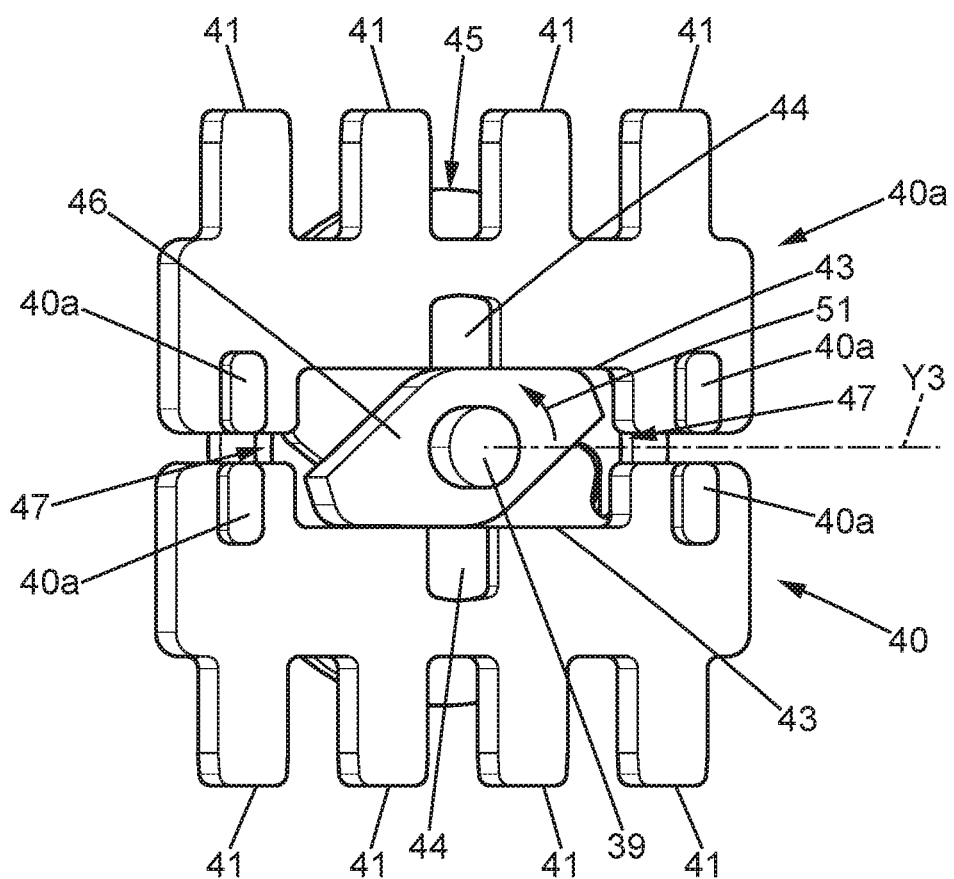
FIG. 13 is a detail view showing only the latches.

When the trigger 33 is held by the spring 37 in the rest position of FIGS. 10 and 12, the pressing of a pin 50 integral with the latch control cam 46 against a stop edge 36 that is part of the trigger, keeps the latch control cam 46 in the unlocking position. The pin 50 may traverse an oblong hole 32a formed in the cover plate 32, in the shape of an arc of a circle centered on the pivot axis Y3.

More particularly, the pin 50 may be part of a control mask 45 integral with the latch control cam 46. The control mask 45 may be a cut piece of sheet metal interposed between the latch control cam 46 and the cover plate 32. The control mask 45 holds the latch or latches 40 in the unlocked position in a positive manner when the latch control cam 46 is in the unlocked position. For this purpose, the latch or each latch 40 may comprise a pin 44 which is engaged in a corresponding cutout 47 of the control mask which has a narrow portion 48 and an enlarged portion 49: when the latch control cam 46 is in the unlocking position, the pin 44 is in the narrow portion 48 of the cutout, its outer edge retaining the latch in the unlocked position.

Figure 14:
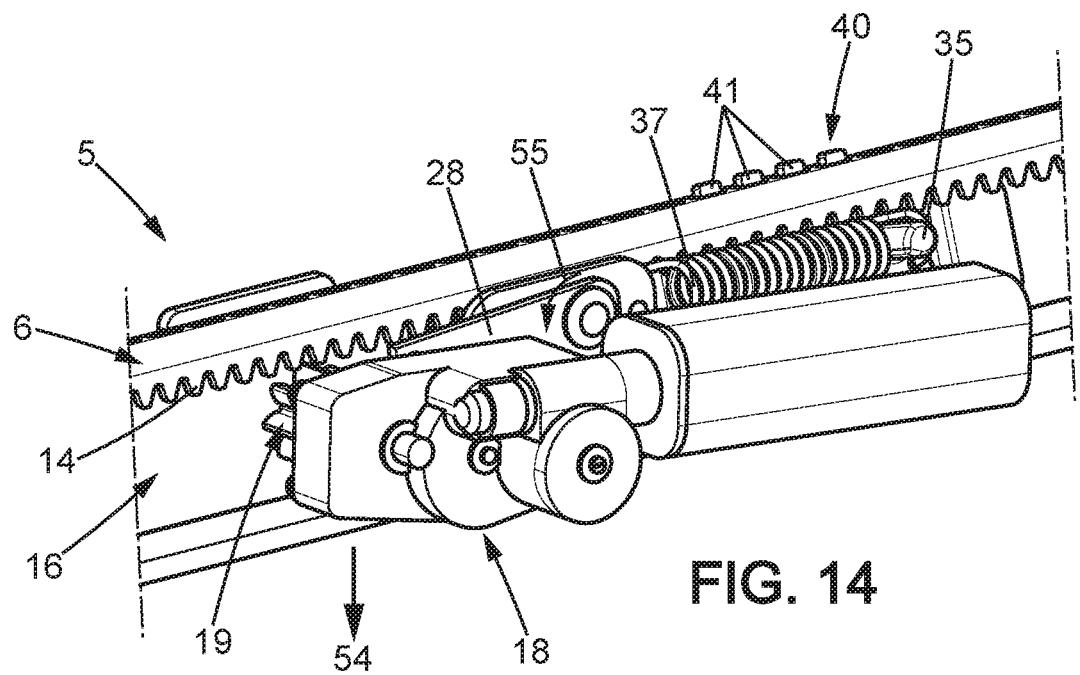
FIG. 14 is a view similar to FIG. 6, in the position where the latches are actuated in the event of a crash.
Figure 15:
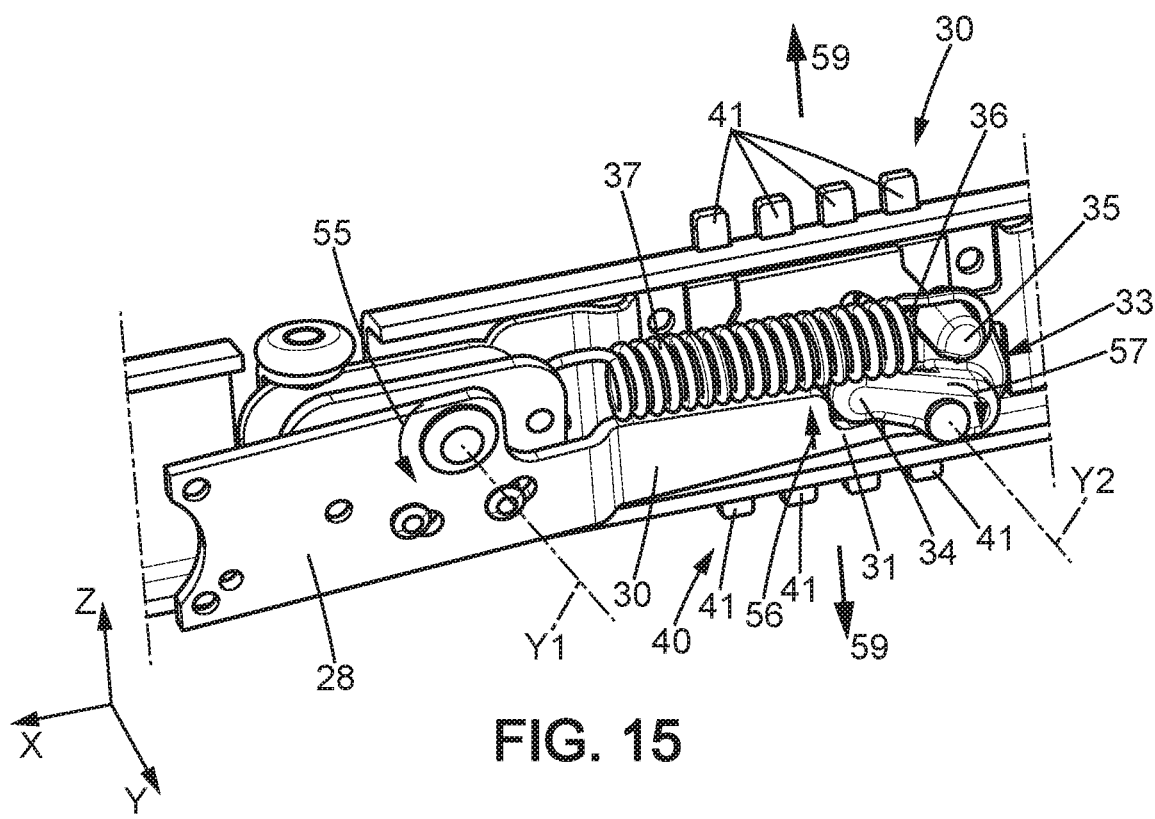
FIG. 15 is a view similar to FIG. 14, without the fixed section and without the motor device.

As shown in FIGS. 14 to 17, when the vehicle in which the seat is installed is in a crash, in particular with frontal impact, the impact generates a force exerted on the movable section 16 that is greater than the aforementioned predetermined threshold, such that the pinion 19 at least partially disengages from the rack 14 (FIG. 14). This disengagement rotates the control member 28 in the angular direction 55, so that the actuating finger 33 moves upwards in direction 56 (FIG. 15), driving the trigger 33 with its cam 34. The trigger 33 therefore rotates in the angular direction 57 against the resilient biasing of the spring 37, to a release position where the pin 50 no longer interferes with said stop edge 36 of the trigger. The latch control cam 46 is thus released and moves to the locking position in the angular direction 51 (FIGS. 16, 17). During this movement, the enlarged portion 49 of each cutout of the control mask comes to face the pin 44 of the corresponding latch, so that the cam 46 can move the latch or latches 40 to the locked position in direction 59. The movable section 16 is then firmly anchored to the fixed section 6 of the rail, regardless of the mechanical strength of the motor device 18 and/or of the rack 14.

The procedure for controlling the latch or latches 40 described above is not limiting; in particular, known control means for locking the latches substantially independently of the relative positions of the movable section 16 and fixed section 6 at the moment of impact may be used.

It will be noted that the space under the seating portion 3 of the seat is not cluttered by a motor between the rails 5 for controlling the rails, which allows either making use of this free space or lowering the seat 1 relative to the floor 4 of the vehicle.

The invention claimed is:

1. Rail for a vehicle seat, comprising first and second rail members mounted so as to slide in relation to one another along a longitudinal direction, said rail comprising a motorized drive mechanism able to cause relative movement between the first and second rail members along the longitudinal direction, said rail further comprising:
    at least one mechanical latch that is movable between an unlocked position where said latch allows the first and second rail members to move freely in relation to one another along the longitudinal direction, and a locked position where said latch immobilizes the first and second rail members in relation to one another, said latch normally being held in the unlocked position, and
    a latch control device able to detect crash conditions and, if crash conditions are detected, to control the latch so as to move it to the locked position,
    wherein the motorized drive mechanism comprises a rack integral with the first rail member and a motor device mounted on the second rail member and comprising a pinion engaged with the rack, at least the pinion being mounted so as to be movable in relation to the rack between an engagement position where said pinion is engaged with the rack and a disengagement position where said pinion is at least partially disengaged from the rack, the pinion being resiliently biased towards the engagement position and able to move from the engagement position to the disengagement position when one of the first and second rail members is subjected to a force greater than a predetermined threshold along the longitudinal direction,
    wherein the latch is movably mounted on the second rail member, and
    wherein the latch control device is mounted on the second rail member and can be actuated by movement of the pinion into the disengagement position.

2. Rail according to claim 1, wherein the latch control device comprises a trigger movably mounted on the second rail member, the latch being resiliently biased towards the locked position and normally held in the unlocked position by the trigger, said trigger being actuated by movement of the pinion to the disengagement position so as to release the latch.

3. Rail according to claim 2, wherein the latch control device comprises a control member movably mounted on the second rail member and movable with the pinion between the engagement position and the disengagement position, the trigger being movable on the second rail member between a rest position where said trigger prevents the latch from moving to the locked position, and a release position wherein said trigger allows the latch to move to the locked position, said trigger being resiliently biased towards the rest position and comprising a cam able to act on the control member so as to maintain the pinion in the engagement position as long as one among the first and second rail members is not subjected to a force exceeding said predetermined threshold along the longitudinal direction, the control member being able to act on the cam of the trigger to move the trigger to the release position when one among the first and second rail members is subjected to a force greater than said predetermined threshold along the longitudinal direction.

4. Rail according to claim 3, wherein the trigger and the control member are pivotally mounted on the second rail member.

5. Rail according to claim 3, wherein the control member is integral with the motor device.

6. Rail according to claim 3, wherein the trigger is able to keep the pinion resiliently applied against the rack when said trigger is in the rest position.

7. Rail according to claim 3, wherein the latch control device comprises a latch control cam which is movable between an unlocking position where the latch control cam allows the latch to be in the unlocked position and a locking position where said latch control cam pushes the latch back to the locked position, the latch control cam being resiliently biased towards the locking position and being integral with a pin which, in the rest position of the trigger, abuts against a stop edge of the trigger so as to hold the latch control cam in the unlocking position, the pin no longer interfering with said stop edge when the trigger is in the release position.

8. Rail according to claim 7, wherein the latch control cam is integral with a latch control mask which comprises at least one retaining edge engaging with a relief of the latch to hold the latch in the unlocked position when the latch control cam is in the unlocking position.

9. Vehicle seat comprising two rails according to claim 1 and a seating portion carried by said rails.

10. Seat according to claim 9, wherein each rail comprises a motorized drive mechanism.

* * * * *